US012629612B2

(12) United States Patent
Hoge et al.

(10) Patent No.: US 12,629,612 B2
(45) Date of Patent: May 19, 2026

(54) MATERIAL AND METHOD FOR PERFORMING A SEPARATION BASED ON HALOGEN BONDING

(71) Applicant: MERCK PATENT GMBH, Darmstadt (DE)

(72) Inventors: Berthold Theo Hoge, Bielefeld (DE); Paul Lukas Waltersmann, Bielefeld (DE); Anne Julia Bader, Bielefeld (DE)

(73) Assignee: Merck Patent GmbH, Darmstadt (DE)

( * ) Notice: Subject to any disclaimer, the term of this patent is extended or adjusted under 35 U.S.C. 154(b) by 858 days.

(21) Appl. No.: 17/771,303

(22) PCT Filed: Oct. 21, 2020

(86) PCT No.: PCT/EP2020/079544

§ 371 (c)(1),
(2) Date: Apr. 22, 2022

(87) PCT Pub. No.: WO2021/078760

PCT Pub. Date: Apr. 29, 2021

(65) Prior Publication Data

US 2023/0001329 A1 Jan. 5, 2023

(30) Foreign Application Priority Data

Oct. 24, 2019 (EP) .................................... 19205109

(51) Int. Cl.
*B01D 15/38* (2006.01)
*B01J 20/32* (2006.01)

(52) U.S. Cl.
CPC ...... *B01D 15/3857* (2013.01); *B01J 20/3208* (2013.01); *B01J 20/3219* (2013.01); *B01J 20/3253* (2013.01); *B01J 20/3255* (2013.01); *B01J 20/3291* (2013.01); *B01J 2220/54* (2013.01); *B01J 2220/58* (2013.01); *B01J 2220/86* (2013.01)

(58) Field of Classification Search
CPC .............. B01D 15/3857; B01J 20/3208; B01J 20/3219; B01J 20/3253; B01J 20/3255; B01J 20/3291
See application file for complete search history.

(56) References Cited

U.S. PATENT DOCUMENTS

| | | | |
|---|---|---|---|
| 5,453,186 | A | 9/1995 | Müller et al. |
| 11,065,558 | B2 | 7/2021 | Nagai et al. |
| 2007/0244307 | A1 | 10/2007 | Engstrand |
| 2017/0037522 | A1 | 2/2017 | Kaczur et al. |
| 2018/0050282 | A1 | 2/2018 | Nagai et al. |
| 2019/0010620 | A1 | 1/2019 | Kaczur et al. |

FOREIGN PATENT DOCUMENTS

| | | | |
|---|---|---|---|
| EP | 3276341 | A1 | 1/2018 |
| JP | 0862198 | A | 3/1996 |
| JP | 2011178936 | A | 9/2011 |
| JP | 5504978 | B2 | 3/2014 |
| WO | 2019175849 | A1 | 9/2019 |

OTHER PUBLICATIONS

Ngo et al., Journal of Chromatography A, (1992), 597(1-2), p. 101-109. (Disclosed in IDS).*
Melissis et al., Journal of Chromatography A, (2002), v.917, p. 29-42.*
International Search Report for PCT/EP2020/079544 dated Jan. 14, 2021.
Kiao Qing Yan et al., Analytica Chimica Acta 753 (2012) 48-56.
P. Peluso et al., Journal of Chromatography A, 1467 (2016) 228-238.
Buffers. A Guide for the Preparation and Use of Buffers in Biological Systems, Gueffroy, D., ed. Calbiochem Corporation (1975).
Ngo T.T. et al., J. of Chromatography, 1992, 597, pp. 101-109.
English Abstract for WO2019175849, Publication Date: Sep. 19, 2019.

* cited by examiner

*Primary Examiner* — Yong L Chu
(74) *Attorney, Agent, or Firm* — EMD MILLIPORE CORPORATION

(57) ABSTRACT

This invention relates to a new stationary phase carrying functional groups comprising a halogen substituted aromatic ring. Target molecules can interact with this stationary phase by halogen bonding. The stationary phase is suitable for SPE or chromatographic separations.

20 Claims, 2 Drawing Sheets

MATERIAL AND METHOD FOR PERFORMING A SEPARATION BASED ON HALOGEN BONDING

This invention relates to a new stationary phase carrying functional groups comprising a halogen substituted aromatic ring. Target molecules can interact with this stationary phase by halogen bonding. The stationary phase is suitable for SPE and chromatographic separations.

BACKGROUND OF THE INVENTION

Halogen bonding refers to the non-covalent interactions of halogen atoms X in some molecules, RX (Lewis Acids), with negative sites, such as the lone pair electrons of a Lewis base, on others, the neutral or anionic Lewis Bases. X can be chlorine, bromine or iodine. Halogen bonding can be explained by the presence of a region of positive electrostatic potential, the o-hole, on the outermost portion of the halogen's surface, centred on the R-X axis. The strength of the interaction increases in going from chlorine to bromine to iodine and can further be amended by amending the residue R of the halogen. Typically the strength of the interaction in halogen bonding is between 10 to 180 KJ/mol and is thus comparable with the strength of hydrogen bridges. This can for example be seen from DOI: 10.2021/acs.chem.rev.5b00484.

Halogen bonding is currently being exploited to control the crystallization of organic compounds, in supramolecular chemistry, in catalysis and in molecular recognition. In addition, halogen bonding is applied for separation applications. Xiao Qing Yan et al., Analytica Chimica Acta 753 (2012) 48-56 disclose the solid phase extraction of perfluorinated iodoalkanes. P. Peluso et al., Journal of Chromatography A, 1467 (2016) 228-238 describe a chromatographic enantioseparation of atropisomeric polyhalogenated 4,4'-bipyridines.

It has now been found that the principle of halogen bonding cannot only be used to separate halogen containing molecules R-X which form the Lewis Acid part of the bond but also the Lewis Bases. The inventors have found that by immobilizing certain molecules R-X on a solid phase, a broad variety of target molecules comprising a Lewis Base part can interact with the immobilized R-X. With this interaction a new chromatographic separation principle can be established providing an additional degree of freedom for chromatographic separation. It could be shown that even proteins can be separated based on halogen bonding.

BRIEF DESCRIPTION OF THE INVENTION

The present invention is thus directed to a stationary phase comprising a base material and at least one type of functional group whereby the functional groups are —$N(R'_2)^+$-ArX with R' being H or C1-C6 alkyl, C2-C6 alkenyl, C2-C6 alkynyl, C6 aryl, preferably methyl, ethyl, propyl, isopropyl and ArX being

I

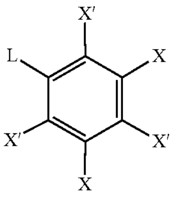

or

-continued

II

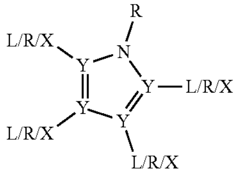

With

L being the bond to the —$N(R'_2)^+$

X and X' being independently of each other H, I, Br or Cl, or another electron withdrawing group like F or $NO_2$ or C1-C10 alkyl, C2-C10 alkenyl, C2-C10 alkynyl, C6-C12 aryl or an electron donating group, R is H or C1-C6 alkyl, C2-C6 alkenyl, C2-C6 alkynyl, C6 aryl Y is independently of each other C or N whereby in Formula I at least one X or X' is Cl, Br or I, preferably one or two of the X is Cl, Br, or I, whereby in Formula II at least one L is present and whereby at least one Y is C and whereby for each Y that is N there is no L/R/X at this N;

or the functional group is a positively charged heterocyclic aromatic group carrying at least one Cl, Br or I residue.

In a preferred embodiment the positively charged heterocyclic aromatic group carrying at least one Cl, Br or I residue has one of the following structures

III

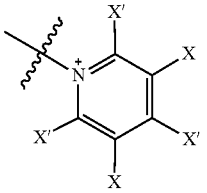

With X being H, I, Br or Cl, and X' being independently of each other H, I,

Br, Cl, F, $NO_2$, or another electron withdrawing group or C1-C10 alkyl, C2-C10 alkenyl, C2-C10 alkynyl, C6-C12 aryl or an electron donating group, whereby at least one X or X' is Cl, Br or I, preferably at least one X is Cl, Br, or I.

The serpentine line in Formula III as well as in the following formulas shows the link to the base material. This might be a single bond or, preferably, a linker or another structure, e.g. a part of a tentacle.

IV

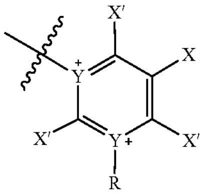

with R being H, C1-C10 alkyl, aryl, C2-C10 alkenyl, C2-C10 alkynyl or an electron withdrawing group or an electron donating group, Y being independently of each other N or P.

X being H, I, Br or Cl, and X' being independently of each other H, I, Br, Cl,

F, $NO_2$, or another electron withdrawing group or C1-C10 alkyl, C2-C10 alkenyl, C2-C10 alkynyl, C6-C12 aryl or an electron donating group, whereby at least one X or X' is Cl, Br or I, preferably X is Cl, Br, or I.

Examples of possible structures according to Formula IV are:

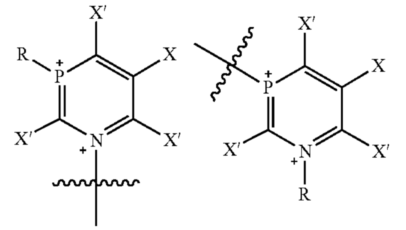

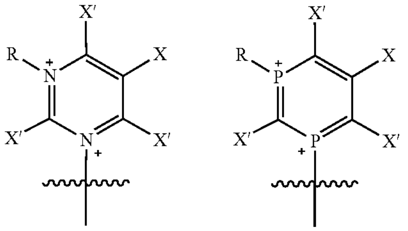

Another possible structure is similar to Formula V,

V

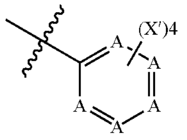

whereby one atom A of the aromatic ring, which is not the one providing for connection to the base material, is $O^+$ or $S^+$ and the other ring atoms A are C-X' with X' being independently of each other H, a C1 to C6 alkyl group, I, Br, Cl, or another electron withdrawing group or C1-C10 alkyl, C2-C10 alkenyl, C2-C10 alkynyl, C6-C12 aryl or an electron donating group, whereby at least one X' is Cl, Br or 1.

Examples of possible structures according to Formula V are:

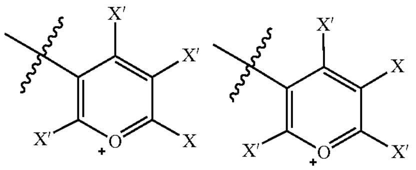

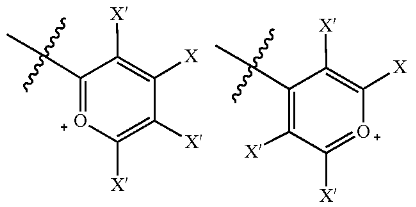

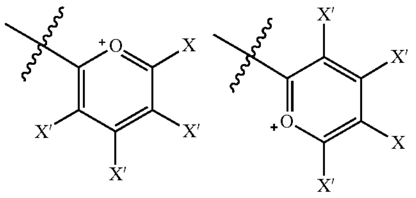

with X being independently of each other H, a C1 to C6 alkyl group, I, Br or Cl, and X' being independently of each other H, a C1 to C6 alkyl group, I, Br, Cl, or another electron withdrawing group or C1-C10 alkyl, C2-C10 alkenyl, C2-C10 alkynyl, C6-C12 aryl or an electron donating group, whereby at least one X or X' is Cl, Br or I, preferably X is Cl, Br, or I The same structures are possible with S instead of O.

Other possible structures are the following:

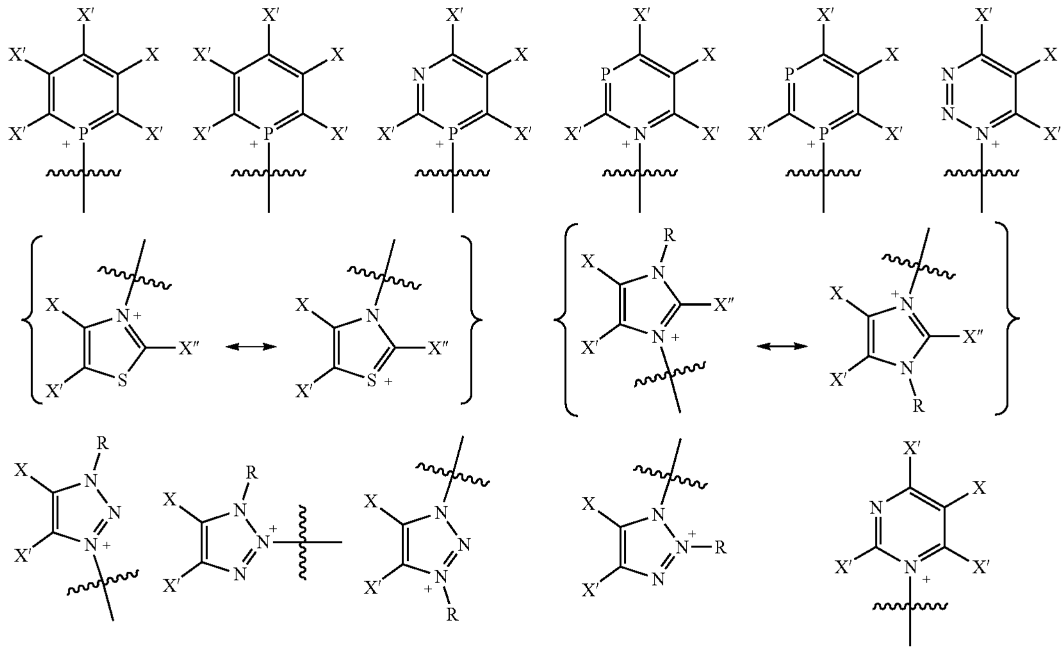

with X being independently of each other H, a C1 to C6 alkyl group, I, Br or Cl, and X' and X" being independently of each other H, I, Br, Cl, or another electron withdrawing group or C1-C10 alkyl, C2-C10 alkenyl, C10 alkynyl, C6-C12 aryl or an electron donating group, R being H, C1-C6 alkyl, C6 aryl, C2-C6 alkenyl, C2-C6 alkynyl or an electron withdrawing group or and electron donating group and whereby at least one X or X' is Cl, Br or I, preferably X is Cl, Br, or I.

In a preferred embodiment, the residues or substituents of the functional group comprise only Cl, Br and/or I as well as H, C1-C6 alkyl and/or one or more electron withdrawing groups.

In a preferred embodiment the functional group has only one heterocyclic ring.

In another preferred embodiment the heterocyclic aromatic group has one type of heteroatom.

In a preferred embodiment the heteroatom in the heterocyclic ring is an N atom.

In another preferred embodiment, the aromatic ring of the functional group is substituted with one or two iodine atoms.

Structures of most preferred functional groups are:

VI

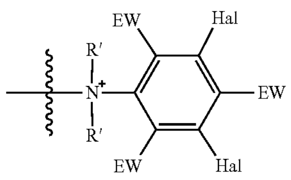

with R' being H or C1-C6 alkyl, preferably methyl, ethyl, propyl, isopropyl,

EW being independent of each other H, $CH_3$ or an electron withdrawing group, preferably H, $CH_3$, F, Cl, $NO_2$ and Hal being independent of each other H, $CH_3$, Cl, Br or I, preferably Br or 1, whereby at least one Hal is Cl, Br or I.

VII

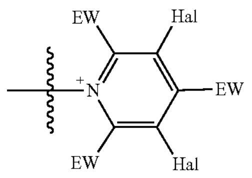

with EW being independent of each other H, $CH_3$, an electron withdrawing group, preferably H, F, Cl, $NO_2$ and Hal being independent of each other H, $CH_3$, Cl, Br or I, preferably Br or I, whereby at least one Hal is Cl, Br or I.

VIII

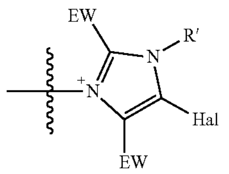

with R' being H or C1-C6 alkyl, preferably methyl, ethyl, propyl, isopropyl,

EW being independent of each other H, $CH_3$ or an electron withdrawing group, preferably H, F, Cl, $NO_2$ and Hal being Cl, Br or I, preferably Br or I.

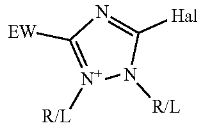

IX with one R/L being H or C1-C6 alkyl, preferably methyl, ethyl, propyl, isopropyl and the other R/L being the connection to the base material, EW being H, $CH_3$ or an electron withdrawing group, preferably F, Cl, $NO_2$ and Hal being Cl, Br or I, preferably Br or I.

Very preferred is a functional group according to structure VI, VII, VIII or IX, most preferred VII, which is attached to a solid support via polymer chains, also called tentacles, made by a grafting process as described below using monomers according to formula XIII with $R^3$ being a functional group according to structure VI, VII, VIII and/or IX. Optionally, additionally other monomers according to formula III can be used which comprise other $R^3$ so that polymer chains are generated that have two or more different functional groups of which at least one function group is selected from structure VI, VII, VIII and/or IX.

In cases where the functional groups have one or more positive charges, there is a negative counter ion. The type of the counter ion is not critical. Suitable counterions are halogen ions, acetate, nitrate, triflate etc.

In a preferred embodiment the functional group is covalently bonded to the base material.

In one embodiment the base material is a bead or a membrane.

In one embodiment, the functional groups are bonded to the base material via a linker.

In one embodiment the functional groups are comprised in polymer chains, also called tentacles, grafted onto the base material.

In a preferred embodiment the base material is an organic polymer, preferably a polystyrene based or a polyvinylether based polymer.

The present invention is further directed to a separation device comprising the stationary phase of the present invention.

In a preferred embodiment, the separation device is a chromatography column comprising the stationary phase of the present invention.

The present invention if further directed to a process for the separation of a target molecule from at least one other compound whereby a stationary phase according to the present invention as described above, preferably present in a separation device, is contacted with a liquid comprising the target molecule and the at least one other compound and whereby the target molecule shows a binding to the stationary phase that is different from the binding of the other compound, e.g. it interacts stronger or weaker with the stationary phase than the other compounds.

In a preferred embodiment, the more able a compound is to donate electrons the stronger it is bound to the stationary phase.

In a preferred embodiment the process is a process for chromatographic separation of a target molecule from at least one other compound whereby a stationary phase according to the present invention as described above is present in a chromatography column and the liquid comprising the target molecule and the at least one other compound is run through the column whereby the target molecule and the other compounds present in the liquid are eluted from the column depending on their interaction with the stationary phase.

In a preferred embodiment, the target molecule is a protein.

In a preferred embodiment the process is performed by loading the stationary phase according to the present invention with an aqueous loading buffer of a certain pH and a certain ionic strength and eluting the target molecule with an aqueous elution buffer of the same pH but another ionic strength, typically a higher ionic strength.

In another embodiment the process is performed by loading the stationary phase according to the present invention with an aqueous loading buffer of a certain pH and a certain ionic strength and eluting the target molecule with an aqueous buffer of another pH and/or another ionic strength.

In another embodiment the process is performed by loading the stationary phase according to the present invention with an organic loading medium and eluting the target molecule with the same medium or a more polar medium, e.g. using a gradient elution. An organic loading medium is an organic liquid that does not comprise more than 10% of water, e.g. methanol, ethanol, acetonitrile, THF, heptane, toluene etc. or mixtures thereof.

The present invention is further directed to the chromatographic separation of two proteins having a different pl (isoelectric point) and/or a different content of carboxylic acids by halogen bonding, preferably using a stationary phase according to the present invention.

Figure 1:
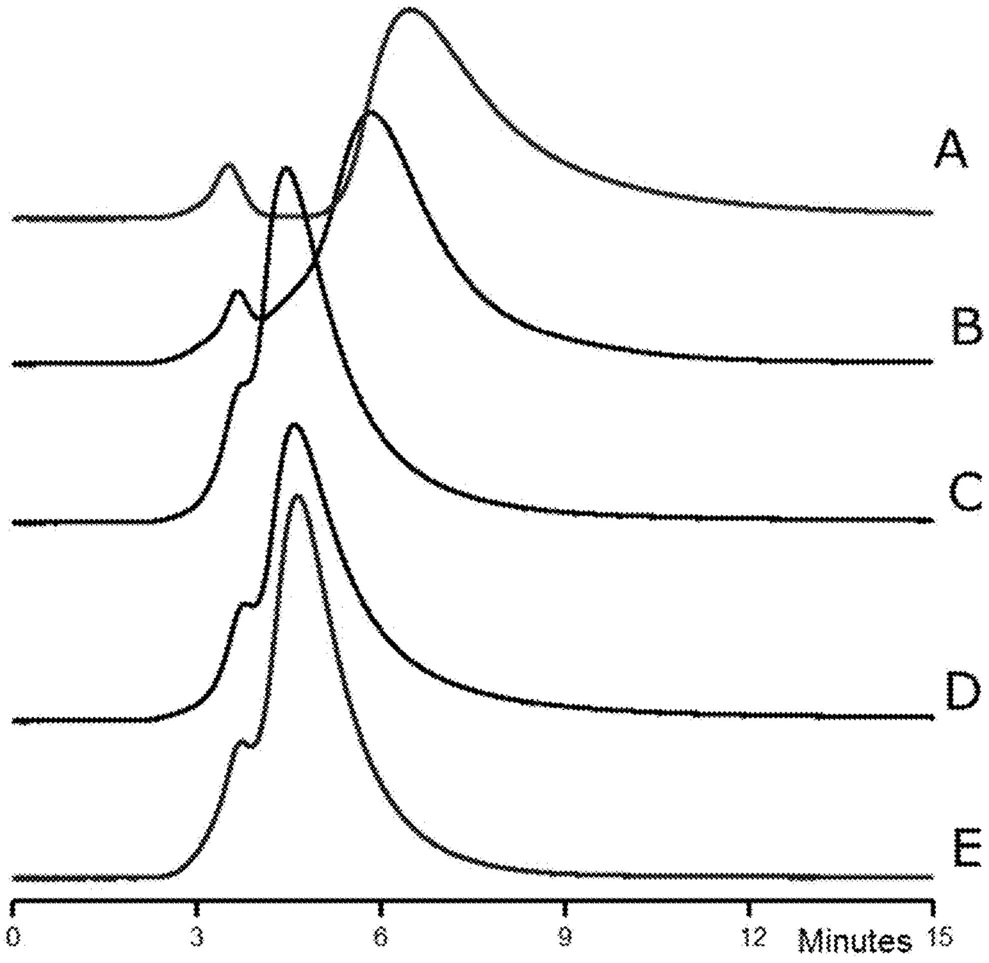
FIGS. 1 and 2 show chromatograms done with stationary phases according to the present invention and others. Further details can be found in application Example 2.1.

Before describing the present invention in detail, it is to be understood that this invention is not limited to specific compositions or process steps, as such may vary. It must be noted that, as used in this specification and the appended claims, the singular form "a", "an" and "the" include plural referents unless the context clearly dictates otherwise. Thus, for example, reference to "a ligand" includes a plurality of ligands and reference to "an antibody" includes a plurality of antibodies and the like.

Unless defined otherwise, all technical and scientific terms used herein have the same meaning as commonly understood by one of ordinary skill in the art to which this invention is related. The following terms are defined for purposes of the invention as described herein.

As used herein the term "target molecule" refers to any molecule, substance or compound that shall be isolated, separated or purified from one or more other components, e.g. impurities, in a sample. In the production and/or purification process the target molecule is typically present in a liquid. The liquid might be water, a buffer, a non-aqueous organic solvent like ethanol, acetonitrile, heptane or any mixture of the named liquids. Beside the target molecule said liquid may comprise one or more impurities. The liquid may also be called sample. The composition of the liquid may change during production and/or purification depending on the process steps that are performed. After a chromatographic step the liquid typically comprises other solvents than before because of the eluent used in the chromatographic step. Examples of target molecules are low molecular weight molecules like drugs having a molecular weight around or below 2000 g/mol. A target molecule may also be a high molecular weight compound like a protein, e.g. an antibody.

The term "antibody" refers to a protein which has the ability to specifically bind to an antigen. "Antibody" or "IgG" further refers to a polypeptide substantially encoded by an immunoglobulin gene or immunoglobulin genes, or fragments thereof, which specifically bind and recognize an analyte (antigen). The recognized immunoglobulin genes include the kappa, lambda, alpha, gamma, delta, epsilon and mu constant region genes, as well as the myriad immunoglobulin variable region genes. Light chains are classified as either kappa or lambda. Heavy chains are classified as gamma, mu, alpha, delta, or epsilon, which in turn define the immunoglobulin classes, IgG, IgM, IgA, IgD, and IgE, respectively.

An exemplary immunoglobulin (antibody) structural unit is composed of two pairs of polypeptide chains, each pair having one "light" (about 25 kD) and one "heavy" chain (about 50-70 kD), said chains being stabilized, for example, by interchain disulfide bonds. The N-terminus of each chain defines a variable region of about 100 to 110 or more amino acids primarily responsible for antigen recognition. The terms variable light chain (V L) and variable heavy chain (V H) refer to these light and heavy chains respectively.

Antibodies may be monoclonal or polyclonal and may exist in monomeric or polymeric form, for example, IgM antibodies which exist in pentameric form and/or IgA antibodies which exist in monomeric, dimeric or multimeric form. Antibodies may also include multispecific antibodies (e.g., bispecific antibodies), and antibody fragments so long as they retain, or are modified to comprise, a ligand-specific binding domain. The term "fragment" refers to a part or portion of an antibody or antibody chain comprising fewer amino acid residues than an intact or complete antibody or antibody chain. Fragments can be obtained via chemical or enzymatic treatment of an intact or complete antibody or antibody chain. Fragments can also be obtained by recombinant means. When produced recombinantly, fragments may be expressed alone or as part of a larger protein called a fusion protein. Exemplary fragments include Fab, Fab', F(ab') 2, Fc and/or Fv fragments. Exemplary fusion proteins include Fc fusion proteins. According to the present invention fusion proteins are also encompassed by the term "antibody".

In some embodiments, an antibody is an Fc region containing protein, e.g., an immunoglobulin.

As used herein, and unless stated otherwise, the term "sample" refers to any composition or mixture that contains a target molecule. Samples may be derived from biological or other sources. Biological sources include eukaryotic sources like animals or humans. The sample may also include diluents, buffers, detergents, and contaminating species and the like that are found mixed with the target molecule.

The term "impurity" or "contaminant" as used herein, refers to any foreign or objectionable molecule, including a biological macromolecule such as DNA, RNA, one or more host cell proteins, nucleic acids, endotoxins, lipids, impurities of synthetic origin and one or more additives which may be present in a sample containing the target molecule that is being separated from one or more of the foreign or objectionable molecules.

The terms "purifying," "separating," or "isolating," as used interchangeably herein, refer to increasing the degree of purity of a target molecule by separating it from a composition or sample comprising the target molecule and one or more other components, e.g. impurities. Typically, the degree of purity of the target molecule is increased by removing (completely or partially) at least one impurity from the composition.

The term "chromatography" refers to any kind of technique which separates an analyte of interest (e.g. a target molecule) from other molecules present in a mixture. Usually, the target molecule is separated from other molecules as a result of differences in rates at which the individual molecules of the mixture migrate through a stationary phase under the influence of a moving phase, or in bind and elute processes. Examples for chromatographic separation processes are reversed phase chromatography, ion exchange chromatography, size exclusion chromatography, affinity chromatography, hydrophobic interaction chromatography and mixed mode chromatography. The chromatography process of the present invention is based on halogen bonding as well as optionally additionally on one or more of the other separation processes mentioned above.

A "buffer" is a solution that resists changes in pH by the action of its acid-base conjugate components. Various buffers which can be employed depending, for example, on the desired pH of the buffer are described in Buffers. A Guide for the Preparation and Use of Buffers in Biological Systems, Gueffroy, D., ed. Calbiochem Corporation (1975). Non-limiting examples of buffers include MES, MOPS, MOPSO, Tris, HEPES, phosphate, acetate, citrate, succinate, glycine and ammonium buffers, as well as combinations of these. An aqueous buffer is a buffer whose solvent comprises more than 90%, preferably 100% water.

The term "stationary phase" refers to any kind of sorbent, matrix, resin or solid phase which in a separation process separates a target molecule from other molecules present in a mixture. Usually, the target molecule is separated from other molecules as a result of differences in rates at which the individual molecules of the mixture bind to the stationary phase and/or migrate through the stationary phase under the influence of a moving phase. Stationary phases can be put in columns or cartridges. The stationary phase according to the present invention comprises at least one type of functional groups.

A "functional group" is a ligand that is attached to the base material of a stationary phase and that determines the binding properties of the stationary phase. Examples of "functional groups" include, but are not limited to, ion exchange groups, hydrophobic interaction groups, hydrophilic interaction groups, thiophilic interactions groups, metal affinity groups, affinity groups, bioaffinity groups, and mixed mode groups (combinations of the aforementioned). The stationary phases according to the present invention comprise at least functional groups for halogen bonding. They might comprise additionally one or more other groups as listed above. Often, one functional group has more than one binding property.

When "loading" a chromatography column in bind and elute mode, a buffer is used to load the sample or composition comprising the target molecule and one or more impurities onto a chromatography column. The buffer has a conductivity and/or pH such that the target molecule is bound to the stationary phase while ideally all the impurities are not bound and flow through the column. The separation of the bound target molecule from the one or more impurities can additionally be done with a change of conductivity and/or pH such that the target molecule is washed or eluted before or after one or more impurities.

Typically the buffer in which the sample is loaded on the stationary phase is called loading buffer or sample buffer.

When "loading" a chromatography column to "flow through" a target molecule, a buffer is used to load the sample or composition comprising the target molecule and one or more impurities onto a chromatography column. The buffer has a conductivity and/or pH such that the target molecule is not bound to the stationary phase and flows through the column while ideally all the impurities are bound the column.

The term "equilibrating" refers to the use of a buffer to equilibrate the stationary phase prior to loading the target molecule. Typically, the loading buffer is used for equilibrating.

By "wash" or "washing" a stationary phase is meant passing an appropriate liquid, e.g. a buffer through or over the stationary phase. Typically washing is used to remove weakly bound contaminants from the stationary phase in bind/elute mode prior to eluting the target molecule or to remove non-bound or weakly bound target molecule after loading.

In this case, typically, the wash buffer and the loading buffer are the same. In case a virus inactivation buffer is used, it is used to inactivate certain present virus prior to eluting the target molecule. In this case, typically, the virus inactivation buffer differs from loading buffer since it may contain detergent/detergents or have different properties (pH/conductivity/salts and their amounts).

Washing can also be used to remove contaminants from the stationary phase after the elution of the target molecule. This is done by passing an appropriate liquid, e.g. a buffer through or over the stationary phase after the elution of the target molecule. In this case, typically, the washing buffer differs from loading buffer. It may contain detergent/detergents or have different properties (pH/conductivity/salts and their amounts). The washing buffer can for example be an acidic buffer.

To "elute" a molecule (e.g. the target molecule or an impurity) from a stationary phase is meant to remove the molecule therefrom. Elution may take place directly in flow though mode when the target molecule is eluted with the solvent front of the loading buffer or by altering the solution conditions such that a buffer different from the loading buffer competes with the molecule of interest for the ligand sites on the stationary phase. A non-limiting example is to elute a molecule from an ion exchange resin by altering the ionic strength of the buffer surrounding the ion exchange material such that the buffer competes with the molecule for the charged sites on the ion exchange material.

The terms "flow-through process," "flow-through mode," and "flow-through operation," as used interchangeably herein, refer to a separation technique in which at least one target molecule contained in a sample along with one or more impurities is intended to flow through a chromatography stationary phase, which usually binds the one or more impurities, where the target molecule usually does not bind (i.e., flows through) and is eluted from the stationary phase with the loading buffer.

The terms "bind and elute mode" and "bind and elute process," as used herein, refer to a separation technique in which at least one target molecule contained in a sample binds to a suitable stationary phase and is subsequently eluted with a buffer different from the loading buffer.

Solid-phase extraction (SPE) is a sample preparation method where the compounds that are dissolved or suspended in a liquid mixture are separated from other compounds depending on their physical and chemical properties. The result is that either the target molecule or undesired impurities in the sample are retained on the stationary phase. The portion that passes through the stationary phase is collected or discarded, depending on whether it contains the target molecule or undesired impurities. If the portion retained on the stationary phase includes the target molecules, they can then be removed from the stationary phase for collection in an additional step, in which the stationary phase is rinsed with an appropriate eluent.

Particle size is determined by laser-diffraction, preferably with Malvern 'Master Sizer.

Pore size is determined by inverse SEC. Particle size is determined by sieving.

An electron withdrawing group includes hydrogen and atoms or groups of atoms that have electron-withdrawing inductive and/or mesomeric effects and which are more electronegative as is hydrogen. Exemplary electron withdrawing groups are H, I, Br, Cl, F, $CO_2H$, $NO_2$, CN.

An electron donating group includes atoms or groups of atoms that have electron-donating inductive and/or mesomeric effects and which are less electronegative than is hydrogen. Exemplary electron donating groups are —OH, O-alkyl.

An alkyl or an alkyl group denotes a straight-chain or branched alkyl group typically having 1 to 20 C atoms or having the number of C atoms as indicated, for example methyl, ethyl, isopropyl, propyl, butyl, sec-butyl or tert-butyl, furthermore pentyl, 1-, 2- or 3-methylbutyl, 1,1-, 1,2- or 2,2-dimethylpropyl, 1-ethylpropyl, n-hexyl, n-heptyl, n-octyl, n-nonyl, n-decyl, n-undecyl or n-dodecyl, n-tridecyl, n-tetracecyl, n-pentadecyl, n-hexadecyl, n-heptadecyl, n-octadecyl, n-nonadecyl or n-eicosyl, preferably the alkyl group has 1 to 10 C atoms.

An alkenyl or alkenyl group denotes a straight-chain or branched alkenyl typically having 2 to 20 C atoms, where, in addition, a plurality of double bonds may be present, is, for example, allyl, 2- or 3-butenyl, isobutenyl, sec-butenyl, furthermore 4-pentenyl, isopentenyl, hexenyl, heptenyl, octenyl, $—C_9H_{17}$, $—C_{10}H_{19}$ to $—C_{20}H_{39}$; preferably allyl, 2- or 3-butenyl, isobutenyl, sec-butenyl.

An aryl or an aryl group denotes an aryl group typically having 6 to 12 C atoms, for example phenyl, naphthyl or anthracenyl, which may be unsubstituted or substituted by Hal, $NH_2$, $NAlK_2$, $NHAlky_2$, $NO_2$, CN, $SO_3H$ or OAlkyl. The substitution may take place once or a number of times by the substituents indicated, preferably once.

The present invention provides a new class of stationary phases which can be used as separation materials, also called resins or matrices, for chromatography or for solid phase extraction. The stationary phase according to the present invention comprises a base material and functional groups which are preferably covalently attached to the base material. It has been found that the principle of halogen bonding can be used to separate target molecules from other compounds in a mixture based on their different binding to stationary phases comprising functional groups that have a Cl, Br or preferably I connected to an aromatic ring, whereby the aromatic ring is positively charged either due to a positive charge directly adjacent to the ring or due to a positive charge within the ring. It has been found that the positive charge combined with the halogen atom linked to an aromatic ring structure results in an effective sigma hole at the halogen atom which enables effective halogen bonding to Lewis bases.

The base materials may consist of irregularly shaped or spherical particles, whose particle size can be between 2 and 1000 μm. Preference is given to particle sizes between 3 and 300 μm.

The base materials may, in particular, be in the form of non-porous, core-shell or preferably porous particles. The pore sizes can be between 2 and 300 nm. Preference is given to pore sizes between 5 and 200 nm. The base materials may equally also be in the form of membranes, fibres, hollow fibres, coatings, filters, capillaries, surfaces or monolithic mouldings. Monolithic mouldings are, preferably porous, three-dimensional bodies, for example in cylindrical form. Preferably the base materials are porous beads or membranes. The base materials might also be made by additive manufacturing like 3D printing.

In one embodiment the base material is an inorganic material, e.g. made of metal oxides like $SiO_2$, $Al_2O_3$, titanium dioxide, zirconium dioxide. It may also be made of other silica based materials like controlled pore glass.

The base material might also be an inorganic-organic hybrid material or any other combination of an organic and an inorganic material.

In another embodiment, the base material is made from a natural polymer, preferably in the form of porous beads, e.g. polysaccharides based on agarose, cellulose, cellulose derivatives and polymers based on dextran. Natural polymer beads are e.g. of the kind known as Sepharose® or Sephadex®. In an alternative embodiment, the base material is made from a synthetic polymer, preferably in the form of porous beads or membranes, comprised of cross-linked synthetic polymers, such as styrene or styrene derivatives, divinylbenzene, acrylamides, acrylate esters, methacrylate esters, vinyl esters, vinyl amides etc. Polymers based on polystyrene, polyvinyl alcohol or copolymers of (meth) acrylate derivatives and comonomers with aliphatic hydroxyl groups are preferred. Polymers based on a certain type of structure like e.g. polystyrene or polyvinylether are polymers comprising said structure. They might also comprise other structures resulting e.g. from co-polymerisation of two different monomers.

In another preferred embodiment, the base material is a polyvinylether based material, especially a copolymer formed by copolymerisation of at least one compound from the group a) and b) with a) at least one hydrophilically substituted alkyl vinyl ether of the formula IX

IX

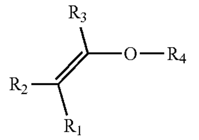

where R1, R2, R3, independently of one another, can be H or C1 to C6 alkyl, preferably H or $-CH_3$, and R4 is a radical which carries at least one hydroxyl group and b)

at least one crosslinking agent conforming to formula X and/or XI and/or XII with

X

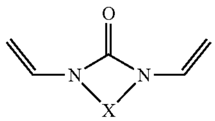

where X is a divalent alkyl radical having 2 to 5 C atoms, preferably 2 or 3 C atoms, in which one or more methylene groups which are not adjacent and are not located in the direct vicinity of N may be replaced by O, C═O, S, S═O, $SO_2$, NH, NOH or N and one or more H atoms of the methylene groups may be substituted, independently of one another, by hydroxyl groups, C1-C6-alkyl, halogen, $NH_2$, C5-C10-aryl, NH—(C1-C8)-alkyl, N—(C1-C8)-alkyl$_2$, C1-C6-alkoxy or C1-C6-alkyl-OH, and

XI

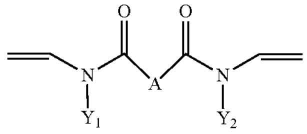

XII

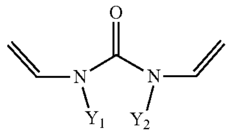

where Y1 and Y2 in formula XI and XII are, independently of one another,

C1 to C10 alkyl or cycloalkyl, where one or more non-adjacent methylene groups or methylene groups which are not located in the direct vicinity of N may be replaced by O, C═O, S, S═O, $SO_2$, NH, NOH or N and one or more H of the methylene groups may be substituted, independently of one another, by hydroxyl groups, C1-C6-alkyl, halogen, $NH_2$, C5-C10-aryl, NH(C1-C8)alkyl, N(C1-C8)alkyl$_2$, C1-C6-alkoxy or C1-C6-alkyl-OH, or C6 to C18 aryl, where one or more H in the aryl system may be substituted, independently of one another, by hydroxyl groups, C1-C6-alkyl, halogen, $NH_2$, NH(C1-C8)alkyl, N(C1-C8)alkyl$_2$, C1-C6-alkoxy or C1-C6-alkyl-OH and A is a divalent alkyl radical having 2 to 5 C atoms, preferably 2 or 3 C atoms, in which one or more non-adjacent methylene groups or methylene groups which are not located in the direct vicinity of N may be replaced by O, C═O, S, S═O, $SO_2$, NH, NOH or N and one or more H of the methylene groups may be substituted, independently of one another, by hydroxyl groups, C1-C6-alkyl, halogen, $NH_2$, C5-C10-aryl, NH(C1-C8)alkyl, N(C1-C8)alkyl$_2$, C1-C6-alkoxy or C1-C6-alkyl-OH.

R4 in formula IX is typically an alkyl radical, a cycloaliphatic radical or an aryl radical which carries at least one hydroxyl group.

In a very preferred embodiment the matrix is formed by copolymerisation of a hydrophilically substituted alkyl vinyl ether employed selected from the group of 1,4-butanediol monovinyl ether, 1,5-pentanediol monovinyl ether, diethylene glycol monovinyl ether or cyclohexanedimethanol monovinyl ether and divinylethyleneurea (1,3-divinylimidazolin-2-one) as crosslinking agent.

An example of a suitable commercially available vinylether based base material is Eshmuno®, Merck KGaA, Germany.

To the base material the functional groups as defined above are attached. This can be done via non-covalent or preferably covalent attachment. Covalent attachment can for example be performed by directly bonding the functional groups to suitable residues on the base material like OH, $NH_2$, carboxyl, phenol, anhydride, aldehyde, epoxide or thiol etc.

It is also possible to attach the functional groups via suitable linkers. The structure of a suitable linker is —X—Z—Y— wherein X and Y are a first and a second reactive or activatable group, and X and Y can each independently be selected from such moeities as hydroxy, amino, thiol, carboxy, oxiranyl, formyl, halo, isocyanato, and chloro sulphonyl; and Z can be selected from such groups as (a) C1-C15 alkyl, (b) aryl (c) C1-C10 alkyl aryl, (d) C1-C10 alkyl aryl C 1-6 alkyl, wherein 1, 2 or more of the carbon atoms of the alkyl may be replaced by an oxygen, sulfur or nitrogen, and wherein aryl includes but is not limited to phenyl, naphthyl, pyridyl or thienyl, and wherein one or more of the carbon atoms might be substituted with OH or C to C6 alkyl; and (e) a peptide of 2 to 10 amino acids, said amino acids included, but not limited to the L- and D-forms of the amino acids including glycine, alanine, valine, leucine, isoleucine, serine, threonine, aspartic acid, asparagine, glutamic acid, glutamine, lysine, hydroxy-lysine, histidine, arginine, phenylalanine, tyrosine, tryptophan, cysteine, methionine, ornithine, beta-alanine, homoserine, homotyrosine, homophenylalanine and citrulline. Other suitable spacers may include, but are not limited to p-benzoquinone, bis-(diazobenzidine), 3,6-bis-(mercurimethyl)dioxane, bisoxiranes, cyanuric chloride, p,p'-difluoro-m,m'-, dicyclohexylcarbodiimide, dinitrophenylsulphone, dimethyladipimidate, dimethylsuberimidate, divinylsulphone, N,N'-ethylene-bis-(iodoacetamide), glutaraldehye, hexamethylene bis-(maleimide), hexamethylene diisocyanate, N,N'-1,3-phenylene-bis-(maleimide), phenol-2,4-disulphonyl chloride, tetra-azotised o-dianisidine, toluene diisocyanate, Woodward's K reagent, water soluble carbodiimides, 6-aminohexanoic acid, hexamethylenedi-amine, 1,7-diamino-4-aza-heptane (3,3'-diamino-dipropylamine), and aminoacids or peptides.

It is also possible to generate the stationary phase according to the present invention by polymerizing monomers comprising the functional groups and a polymerizable moiety. Examples of stationary phases generated by polymerization of suitable monomers are polystyrene, polymethacrylamide or polyacrylamide based stationary phases generated by polymerizing suitable styrole or acryloyl monomers.

In another embodiment the stationary phase can be generated by grafting the functional groups onto the base material.

In the case of "grafting to", polymer chains must firstly be formed from the monomers and bound to the surface of the base material in a second step. In the case of "grafting from", a polymerisation reaction is initiated on the surface of the base material, and the graft polymer is built up directly from individual monomers.

Preference is given to the "grafting from" method and particular preference is given to variants in which only a few by-products, such as a non-covalently bonded polymer, which have to be separated off are formed. Processes with controlled free-radical polymerisation, such as, for example, the method of atom-transfer free-radical polymerisation (ATRP), are suitable. Here, an initiator group is covalently bonded to the surface of the base material in the desired density in a first step. An initiator group can be, for example, a halide bonded via an ester function, as in a 2-bromo-2-methylpropionic acid ester. The graft polymerisation is carried out in a second step in the presence of copper (I) salts.

A very preferred one-step grafting from polymerisation reaction suitable for the production of the stationary phase of the present invention can be initiated by cerium (IV) on a hydroxyl-containing support, without the support having to be activated.

This cerium (IV) initiated grafting is preferably carried out in accordance with EP 0 337 144 or U.S. Pat. No. 5,453,186. The chain produced is linked to the base material via a monomer unit. To this end, the base material according to the invention is suspended in a solution of monomers, preferably in an aqueous solution. The grafting-on of the polymeric material is effected in the course of a conventional redox polymerisation with exclusion of oxygen. The polymerisation catalyst employed is cerium (IV) ions, since this catalyst forms free-radical sites on the surface of the base material, from which the graft polymerisation of the monomers is initiated. This reaction is normally carried out in dilute mineral acids. In order to carry out this graft polymerisation, the acid is usually employed in an aqueous solution with a concentration in the range from 1 to 0.00001 mol/l, preferably from 0.1 to 0.001. Very particular preference is given to the use of dilute nitric acid, which is employed with a concentration in the range from 0.1 to 0.001 mol/l. For the preparation of the separating materials according to the invention, the monomers are normally added in excess to the base material. Typically, 0.05 to 100 mol of total monomer are employed per litre of sedimented polymer material, preferably 0.05-25 mol/l are employed.

The polymerisation is terminated by termination reactions involving the cerium salts. For this reason, the (average) chain length can be influenced by the concentration ratios of the base material, the initiator and the monomers. Furthermore, uniform monomers or also mixtures of different monomers can be employed; in the latter case, grafted copolymers are formed.

The monomers to be favourably used for the preparation of the separation materials according to the present invention are those according to formula XIII

XIII

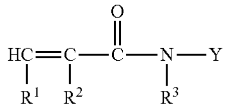

with $R^1$, $R^2$ and Y being independently from each other H or $CH_3$, preferably H.

$R^3$ being the functional group according to the present invention or a chemical structure comprising the functional groups of the present invention.

The separation materials according to the present invention preferably only contain tentacle-like linear polymer structures grafted onto the base material that are built from monomers according to formula XIII. Preferably, they contain linear polymers that are only build by one type of monomer according to formula XIII.

But it is also possible that the linear polymers are built by co-polymerization of two or more different monomers according to formula XIII. It is also possible that the linear polymers are built by co-polymerization of one or more different monomers according to formula XIII and one or more other polymerizable monomers like other acrylamides, methacrylates, acrylates, methacrylates etc. which are functionalized e.g. with ionic, hydrophilic or hydrophobic groups.

The same holds true for stationary phases according to the present invention made by a different process. They might comprise one, two or more of the functional groups for halogen bonding as described above as well as further functionalities beside the functional groups for halogen bonding. This might for example be ionic, hydrophilic or hydrophobic groups. By generating a stationary phase with two different functionalities, one obtains mixed mode materials with separation properties resulting from both or several types of functionalities, whereby in case of the present invention at least one functional group is suitable for halogen bonding.

The present invention is further directed to a separation device comprising the stationary phases according to the present invention. The device can for example be used for solid phase extraction or for chromatographic applications. In any case it comprises a means for holding the stationary phase. The stationary phase might be surrounded by the device or attached to it. In one embodiment, the device comprises a housing with an inlet and an outlet. In another embodiment it is a flat plate or a pin with the stationary phase attached to one side of it. In another embodiment it is a filter comprising the stationary phase. In a preferred embodiment the device is a chromatography column comprising the above described stationary phases according to the present invention. Chromatography columns are known to a person skilled in the art. They typically comprise cylindrical tubes or cartridges filled with the stationary phase as well as filters and/or means for fixing the stationary phase in the tube or cartridge and optionally connections for solvent delivery to and from the tube or cartridge. The size of the chromatography column varies depending on the application, e.g. analytical or preparative.

The stationary phases according to the invention can also be described as base materials provided with separation effectors whereby at least one of the separation effectors comprises a functional group as defined above. They can be used for the selective, partially selective or non-selective binding or adsorption of one or more target molecules with the aim of separation out of a sample liquid, or for the selective, partially selective or non-selective binding or adsorption of one or more secondary components with the aim of separation of the secondary component out of a matrix, the isolation, enrichment and/or depletion of biopolymers from natural sources, the isolation, enrichment and/or depletion of biopolymers from recombinant sources, the isolation, enrichment and/or depletion of proteins and peptides, the isolation, enrichment and/or depletion of monoclonal and polyclonal antibodies, the isolation, enrichment and/or depletion of viruses, the isolation, enrichment and/or depletion of host cell proteins, the isolation, enrichment and/or depletion of ADCs, the isolation, enrichment and/or depletion of alkaloids, lipids like diglycerides or triglycerides, carbohydrates, nucleic acids or other biomolecules.

The target molecules are separated from at least one or more other substances from a sample, whereby the sample which comprises the target molecule is a liquid or is dissolved in a liquid, which is brought into contact with the stationary phase according to the invention. Contact times are usually in the range from 30 seconds to 24 hours. It is advantageous to work in accordance with the principles of liquid chromatography by passing the liquid through a chromatography column which contains the stationary phase according to the invention. The liquid can run through the column merely through its gravitational force or it can be pumped through by means of a pump. An alternative method is batch chromatography, in which the stationary phase is mixed with the liquid by stirring or shaking for as long as the target molecules need to be able to bind to the stationary phase. It is likewise possible to work in accordance with the principles of the chromatographic fluidised bed by introducing the liquid to be separated into, for example, a suspension comprising the stationary phase, where the separating material is selected so that it is suitable for the desired separation owing to its high density and/or a magnetic core.

If the chromatographic process is run in the bind and elute mode, the target molecule binds to the stationary phase according to the invention. The stationary phase can optionally, subsequently be washed with a wash buffer, which preferably has the same ion strength and the same pH as the liquid in which the target molecule is brought into contact with the stationary phase. The wash buffer removes all substances which do not bind to the stationary phase. Further washing steps with other suitable buffers may follow without desorbing the target molecule. The desorption of the bound target molecule is typically carried out by changing the ion strength in the eluent and/or by changing the pH in the eluent and/or by changing the solvents. The target molecule can thus be obtained in a purified and concentrated form in the eluent. The target molecule usually has a purity of 70 percent to 99 percent, preferably 85 percent to 99 percent, particularly preferably 90 percent-99 percent, after desorption from the stationary phase.

However, if the chromatographic process is run in the flow-through mode, the target molecule remains in the liquid phase, but other accompanying substances bind to the stationary phase. The target molecule is then obtained directly by collecting the column eluate in through-flow.

The stationary phases according to the present invention can be used for plenty of different applications. They can for example be used for hydrophilic and hydrophobic separations as well as for aqueous and non-aqueous separations.

Proteins like insulin can for example be suitably purified on a stationary phase that comprises a hydrophilic base material to which the functional groups are bonded. Preferably, the functional groups are grafted onto the base material. Example 2.1 shows one suitable stationary phase for this application. The chromatographic separation is then preferably performed by using an aqueous buffer system at neutral pH and by increasing the ionic strength of the buffer for elution, e.g. by adding sodium chloride.

It is also possible to separate two proteins having a different pl (isoelectric point) and/or a different content of carboxylic acids by halogen bonding using a chromatography column of the present invention. The carboxylic acids, especially those exposed to the surface of the protein, can interact with the stationary phase by halogen bonding. Proteins with a higher content of carboxylic acid groups that can interact with the stationary phase bind stronger to the stationary phase and need to be eluted with higher conductivity. This is also shown in Example 2.2

But a stationary phase based on an hydrophilic base material to which the functional groups are bonded, preferably by grafting to, can also be used for separation of target molecules in organic solvent systems. In this case loading and elution can be done with the same solvent or with a solvent gradient by slowly increasing the amount of a more polar solvent compared to the loading solvent.

The stationary phase according to the present invention can also comprise a hydrophobic base material like polystyrene. The functional groups can for example be connected to the polystyrene base material via a suitable linker. Such a stationary phase can be suitably applied for the separation of low molecular weight compounds using organic solvents for loading and elution.

The stationary phases and the processes according to the present invention provide a new chromatographic separation principle that is widely applicable. The use of functional groups comprising at least one Cl, Br or I bound to a positively charged or chargeable aromatic ring structure provide for a wide range of ligands that can be adjusted to the specific separation task. The choice of the halogen for example can influence the strength of the interaction with the target molecule. Typically, iodine shows the strongest interaction, followed by Br, whereas the interaction of a chlorine substituted functional group is the least strong.

Additionally, by choosing certain aromatic ring structures or residues, the mode of interaction can also be modified. For example, typically, electron withdrawing residues at the aromatic ring structure enlarge the halogen binding effect, whereby electron donating or alkyl groups reduce the halogen bonding strength. Depending on the target molecule and the separation to be performed, the halogen binding strength of the functional group can be adjusted. On can for example start with a structure that only comprises one Cl, Br or I residue and no other residues beside H. In case the strength shall be enlarged, the type of the halogen atom can be changed to Br or I and/or the number of halogen atoms can be increased and/or additional electron withdrawing residues can be inserted. On the other hand, if the halogen bonding strength shall be reduced, the type of the halogen atom can be changed to Br or Cl and/or electron donating groups, e.g. O-alkyl groups, or alkyl groups can be inserted.

In one embodiment, the halogen binding property of the stationary phase according to the present invention can be turned on and off. When using a stationary phase comprising a functional group as shown in formula I or II, comprising a positive charge adjacent to an aromatic ring by protonating a nitrogen atom of an aniline like species, it is possible to “activate” the stationary phase under low pH conditions. As long as the nitrogen atom adjacent to the aromatic ring is protonated, it acts as an electron withdrawing group thereby supporting the sigma hole at a halogen atom located at the adjacent aromatic ring and thus the binding of a target molecule via halogen bonding. Elution can then be performed by just rising the pH and “deactivating” the stationary phase by deprotonating the N atom and thereby eliminating its electron withdrawing function.

It is also possible to suppress the Coulomb-interactions of the stationary phase by using high concentrations of salt like sodiumchloride.

Without further elaboration, it is believed that one skilled in the art can, using the preceding description, utilise the present invention to its fullest extent. The preferred specific embodiments and examples are, therefore, to be construed as merely illustrative, and not limiting to the remainder of the disclosure in any way whatsoever.

The entire disclosures of all applications, patents, and publications cited above and below as well as of the corresponding EP application EP19205109.2 filed on Oct. 24, 2019, are hereby incorporated by reference.

EXAMPLES

The following examples represent practical applications of the invention.

1. Synthesis

Synthesis of N-(2-aminoethyl)-pyridinium chloride hydrochloride

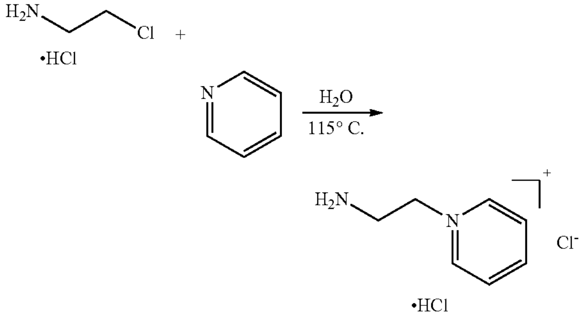

A round bottom flask is filled with 2-chloroethylamine hydrochloride (4.04 g, 34.8 mmol, 1 eq.) and pyridine (5.40 mL, 68 mmol, 2 eq.). After the addition of water (14 mL) the two-phase system is stirred and heated to reflux for 14 hours. The clear yellow solution is washed with toluene (2×25 mL), n-pentane (20 mL) and isopropyl alcohol (3×50 mL) and evaporated to dryness in vacuum. N-(2-aminoethyl)-pyridinium chloride hydrochloride is obtained as a colorless solid.

Yield: 5.54 g (28.4 mmol, 82%).

$^1$H-NMR ($D_2O$, 300 MHZ): δ=3.80 (m, 2H, $H_2N$—$CH_2$), 5.08 (m, 2H, $H_2C$—$N_{Pyridine}$), 8.24 (m, 2H, meta-H), 8.71 (m, 1H, para-H), 9.03 ppm (m, 2H, ortho-H).

Mp.: 199-202° C.

MS (ESI) pos.: 123.0 (100%) $[M]^+$, 281.1 (22%), 2 $[M]^+$ $Cl^-$.

Synthesis of N-(2-aminoethyl)-3-bromopyridinium chloride hydrochloride

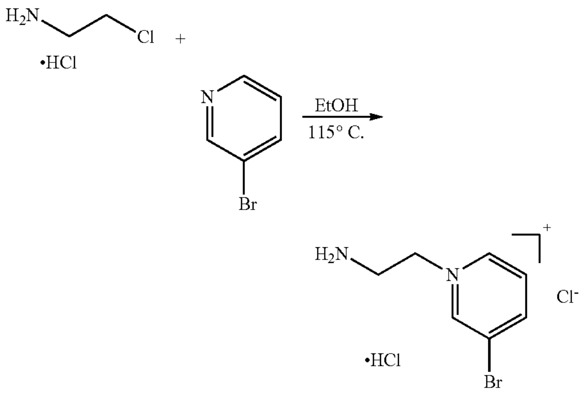

A solution of 2-chloroethylamine hydrochloride (30.2 g, 260 mmol, 1 eq.) and 3-bromopyridine (46.0 g, 291 mmol, 1.1 eq.) in Ethanol (100 mL) is stirred and heated to reflux for two weeks. The precipitate is filtered and washed with Ethanol 5×5 mL). N-(2-aminoethyl)-3-brompyridiniumchloride hydrochloride is obtained as a colorless solid. The filtrate is partially evaporated and again heated to reflux for one week. The resulting colorless solid is washed with ethanol (5×5 mL), evaporated to dryness in vacuum and added to the previous yield.

Yield: 41.2 g, (211 mmol, 81%).

$^1$H-NMR ($D_2O$, 300 MHZ): 0=3.68 (t, 2H, J=7 Hz, $H_2N$—$CH_2$), 4.95 (t, 2H, J=7 Hz, $H_2C$—$N_{Pyridine}$), 8.03 (m, 1H, meta-H), 8.79 (m, 1H, para-H), 8.94 (m, 1H, ortho-CH—CH—) 9.25 ppm (m, 1H, ortho-CH—CBr—).

Elemental analysis: calc.: N, 10.26%, C, 30.69%, H, 4.05%, measured: N, 10.34%, C, 30.76%, H, 3.99%.

Mp.: 237° C.

MS (ESI) pos.: 202.9 (100%) $[M]^+$, 157.8 (6%) [3-Brompyridinium]$^+$.

Synthesis of N-(2-aminoethyl)-3-iodopyridinium chloride hydrochloride

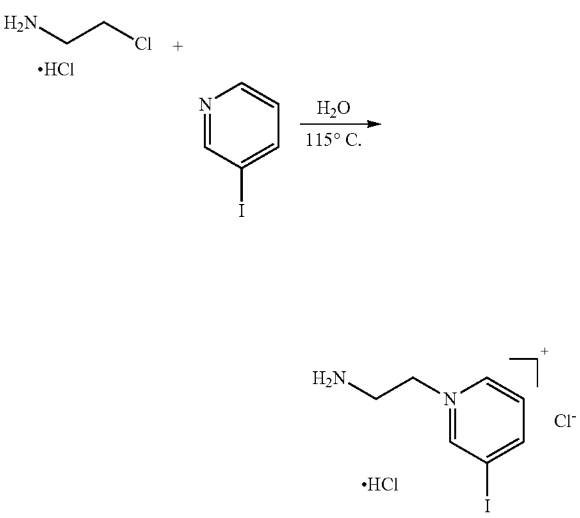

2-chloroethylamine hydrochloride (30.0 g, 259 mmol, 1 eq.) is dissolved with 3-iodopyridine (57.2 g, 279 mmol, 1.1 eq.) in Ethanol (100 mL) is stirred and heated to reflux for one week. The precipitate is filtered and washed with Ethanol (6×20 mL). N-(2-aminoethyl)-3-brompyridinium chloride hydrochloride is obtained as a colorless solid. The filtrate is partially evaporated and again heated to reflux for one week. The resulting colorless solid is washed with ethanol (4×5 mL), evaporated to dryness in vacuum and added to the previous yield. This procedure is repeated until an overall yield of 76%.

Yield: 68.2 g, (213 mmol, 76%).

Mp.: 268.2° C.

Elemental analysis: calc.: N, 8.73%, C, 26.19%, H, 3.45%, measured: N, 8.82%, C, 26.24%, H, 3.41%.

MS (ESI) pos.: 248.9 (100%) $[M]^+$.

$^1$H-NMR ($D_2O$, 300 MHZ): 0=3.64 (t, 2H, J=7 Hz, $H_2N$—$CH_2$), 4.88 (t, 2H, J=7 Hz, $H_2C$—$N_{Pyridine}$), 7.84 (t, J=6 Hz 1H, meta-H), 8.91 (m, 2H, para-H, ortho-CH-CH—), 9.28 ppm (s, 1H, ortho-CH—CBr—).

Synthesis of 1-(2-methacrylamidoethyl)-pyridiniumchloride

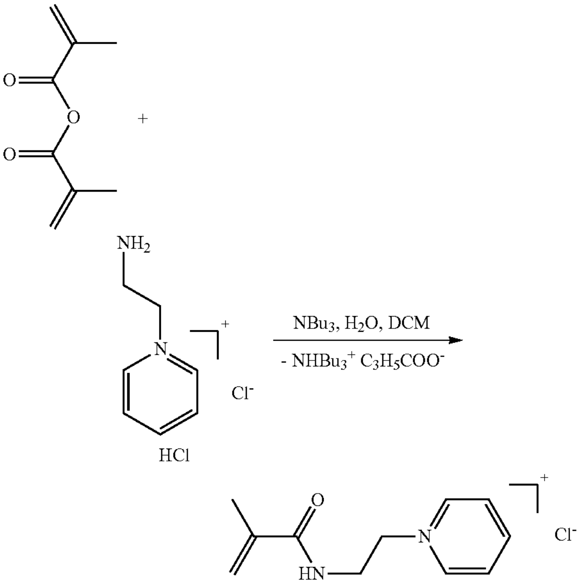

chloride hydrochloride (38.6 g, 147 mmol) is solved in water (50 mL) and then dichloromethane (200 mL), tributylamine (54.7 g, 295 mmol) and methacrylic anhydride (24.8 g, 161 mmol) are added. The reaction is stirred at room temperature for 18 hours and then checked by $^1$H-NMR spectroscopy for remaining N-(2-aminoethyl)-pyridinium chloride. If that is the case, the aqueous layer is separated and mixed again with dichloromethane, tributylamine and methacrylic anhydride are added according to the remaining educt.

The aqueous phase is separated and washed with dichloromethane (2×50 mL). Due to the polymerization-tendency of the product, the yield is determined by $^1$H-NMR spectroscopy in aqueous solution with tetraphenylphosphonium chloride.

Yield: 26.2 g (116 mmol, 71%)

MS (ESI) pos.: 191.0 (100%) $[M]^+$, 234.1 (28%) [1-(2-((2-methacrylamidoethyl)amino)ethyl)pyridini-um]$^+$.

$^1$H-NMR ($H_2O$, 300 MHZ): δ=1.69 (s, 3H, $CH_3$), 3.77 (q, 2H, J=6 Hz, HN—$CH_2$), 4.72 (t, 2H, J=5 Hz, HN—$CH_2$-$CH_2$), 5.32 (s, 1H, =$CH^a$), 5.51 (s, 1H, =$CH^b$), 8.01 (t, J=7 Hz, 2H, meta-H), 8.18 (m, 1H, NH), 8.49 (m, 1H, J=8 Hz, para-H), 8.81 (d, 2H, J=6 Hz, ortho-H).

Synthesis of 1-(2-methacrylamidoethyl)-3-bromopyridinium chloride

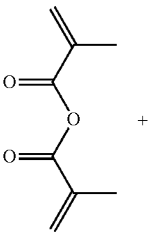

-continued

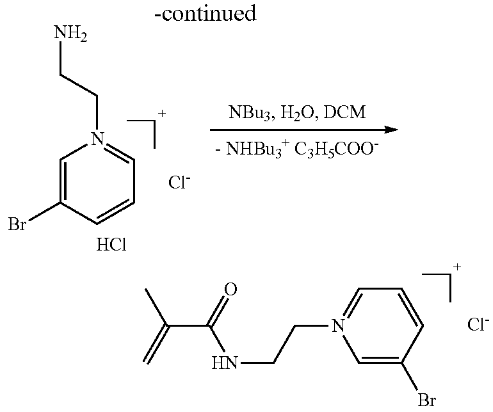

N-(2-aminoethyl)-3-bromopyridinium chloride hydrochloride (3.09 g, 13.0 mmol) is solved in water (5 mL) and then dichloromethane (50 mL), tributylamine (3.38 g, 14.2 mmol) and methacrylic anhydride (2.24 g, 14.2 mmol) are added. The reaction is stirred at room temperature for 19 hours and then checked by $^1$H-NMR spectroscopy for remaining N-(2-aminoethyl)-3-bromopyridinium chloride. If that is the case, the aqueous layer is separated and mixed again with dichloromethane, tributylamine and methacrylic anhydride are added according to the remaining educt. After stirring for six hours at room temperature the aqueous phase is separated and washed with dichloromethane (3×30 mL) and evaporated to dryness in vacuum. 3-bromo-1-(2-methacrylamidoethyl)-pyridinium chloride is obtained as brown glass.

Yield: 2.77 g (9.02 mmol, 70%).

MS (ESI) pos.: 217.0 (100%) $[M]^+$, 575.0 (6%) 2 $[M]^+$ $Cl^-$.

$^1$H-NMR ($D_2O$, 300 MHZ): δ=1.78 (s, 3H, $CH_3$), 3.81 (m, 2H, HN—$CH_2$), XXX (m, 2H, HN—CH2-CH2-), 5.41 (s, 1H, =$CH_{2(A)}$), 5.58 (s, 1H, =$CH_{2(B)}$), 7.97 (m, 1H, meta-H), 8.25 (m, 1H, para-H), 8.88 (m, 1H, N—CH—CH), 9.20 (s, 1H, N—CH—CBr).

Synthesis of 3-iodo-1-(2-methacrylamidoethyl)-pyridinium chloride

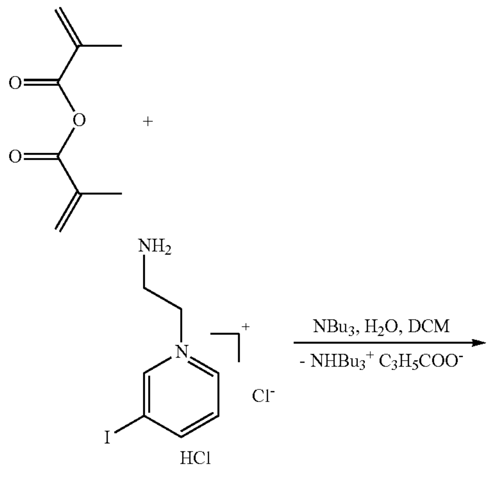

-continued

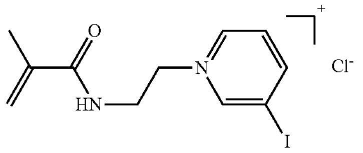

N-(2-aminoethyl)-3-iodopyridinium chloride hydrochloride (32.0 g, 99.7 mmol) is solved in water (50 mL) and then dichloromethane (200 mL), tributylamine (37.0 g, 200 mmol) and methacrylic anhydride (17.8 g, 116 mmol) are added. The reaction is stirred at room temperature for 17 hours and then checked by $^1$H-NMR spectroscopy for remaining N-(2-aminoethyl)-3-iodopyridinium chloride. If that is the case, the aqueous layer is separated and mixed again with dichloromethane, tributylamine and methacrylic anhydride are added according to the remaining educt. The aqueous phase is separated and washed with dichloromethane (2×100 mL) and evaporated to dryness. 3-iodo-1-(2-methacrylamidoethyl)-pyridinium chloride remains as brown solid.

Yield: 33.76 g (95.7 mmol, 96%).

Mp.: 254.5° C.

Elemental analysis: calc.: N, 7.94%, C, 37.47%, H, 4.00%, measured: N, 7.67%, C, 36.14%, H, 4.35%.

MS (ESI) pos.: 317.0 (100%) $[M]^+$.

$^1$H-NMR ($D_2O$, 300 MHZ): 0=1.79 (s, 3H, $CH_3$), 3.80 (t, J=6 Hz, 2H, HN—$NH_2$), 5.41 (s, 1H, =$CH_2$), 5.57 (s, 1H, =$CH_2$), 7.79 (t, 1H, J=7 Hz, meta-H), 8.21 (m, 1H, NH), 8.86 (m, 2H, N—CH—CH—CH—), 9.22 ppm (s, 1H, N—CH—Cl—). $^{13}$C {H}-DEPT135-NMR ($D_2O$, 75 MHZ): δ=17.7 ($CH_3$), 39.8 (—NH—$CH_2$—), 61.2 (—NH—$CH_2$—$CH_2$—), 82.3 (Cl), 121.8 (=$CH_2$), 128.5 (meta-C), 138.3 ($H_3C$—C), 143.7 (N—CH—CH—), 150.3 (N—CH—Cl—), 154.4 (para-C), 172.2 ppm (C=O). $^1$H, $^{13}$C-HMBC ($D_2O$, 300/75 MHZ): 0=4.7/61.2 ppm (J=147 Hz, NH—$CH_2$—$CH_2$—N).

Synthesis of N-(3-bromophenyl) ethane-1,2-diamine

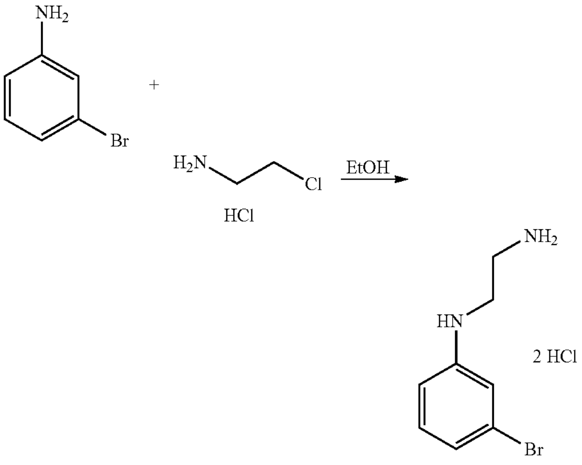

The 3-bromoaniline (3.000 g, 25.86 mmol), 2-chloroethan-1-amine hydrochloride (4.786 g, 27.82 mmol) and ethanol (11 mL) are given into a 100 ml breaker. The reaction mixture is stirred for a few minutes at room temperature. Then it is given into the reaction vessel of the microwave. The reaction vessel is placed into the microwave and the following method is selected and started: method: Quick test; temperature: 110° C.; power: 300 W; pressure: x bar; hold time: 30 min; stir: off; cooling: off. After cooling a new method is selected and started: method: new method; temperature: 120° C.; power: 300 W; pressure: 8 bar; hold time: 30 min; stir: on (med); cooling: on. After cooling over night the pink crystals are filtrated, washed with isopropyl alcohol and evaporated to dryness in vacuum.

Yield: 1.221 g (4.24 mmol, 16%).

Mp.: 212.0° C.-213.0° C.

$^1$H-NMR ($D_2O$, 300 MHZ): D=3.12 (m, 2H, $H_2N$—$CH_2$), 3.38 (m, 2H, HN—$CH_2$), 6.66 (m, 1H, ortho-CH—CH), 6.88 (m, 2H, ortho-CH—CBr, para-H), 7.07 (m, 1H, meta-H).

Functionalization of Beads with 1-(2-methacrylamidoethyl)-pyridiniumchloride

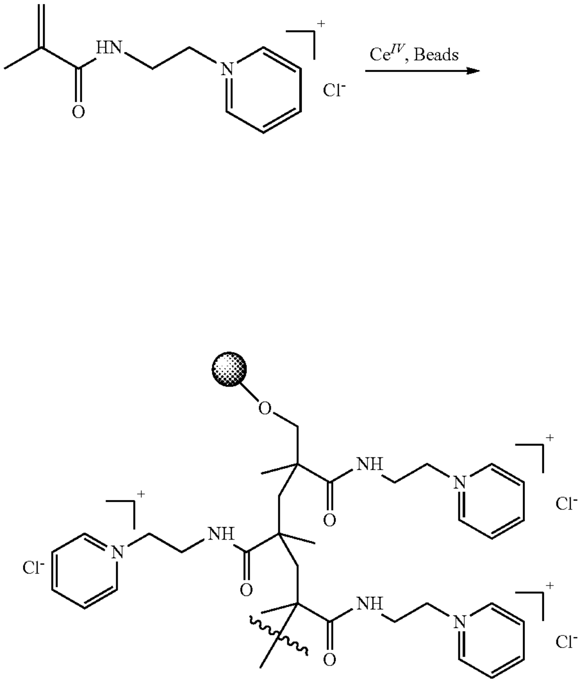

The 1-(2-methacrylamidoethyl)-pyridiniumchloride in aqueous solution (1.29 mol/L, 2.13 mL, 2.75 mmol) is given into a three-neck round bottom flask and water (15.3 mL) is added. The pH is set to 1.5 with nitric acid. A base material made of hydrophilic polyvinyl ether beads carrying OH groups, similar to the base material of the commercially available Eshmuno® sorbents (17.0 g, wet) (Beads) is added. The initiator solution is prepared by adding nitric acid (239 µL, 3.85 mmol), water (7 mL) and ceric ammonium nitrate (515 mg, 939 µmol) to a dropping funnel. Both mixtures are degassed by vacuum and nitrogen. The suspension is heated to 30° C. and the initiator solution is added as fast as possible. The mixture is stirred for four hours, than filtrated and washed with 3×100 mL demineralized water (ultrapure water/Milli-Q® water)=VE Wasser 7×100 mL 1M sulphuric acid, 0,2M ascorbic acid 10×100 mL demineralized water 2×100 mL 1M Sodium hydroxide solution 2×100 mL demineralized water Adjust pH with 25% hydrochloric acid to 6.5-7.0.

1×100 mL demineralized water

1×100 mL ethanol.

The resulting colorless solid is dried in vacuum.

Yield: 3.38 g

Functionalization of Beads with 1-(2-methacrylamidoethyl)-3-bromopyridiniumchloride

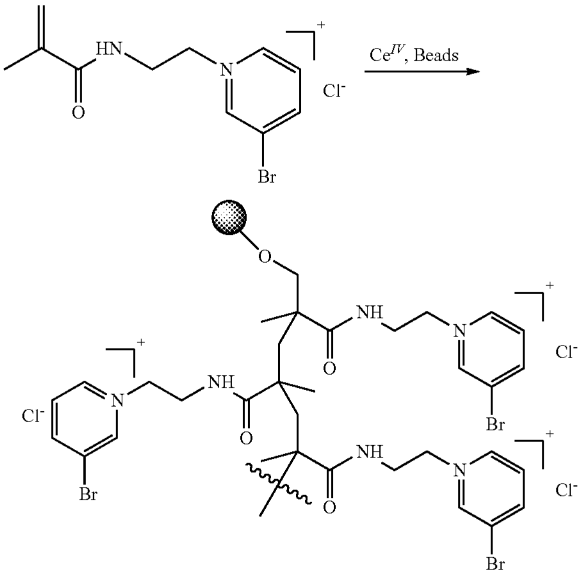

The 1-(2-methacrylamidoethyl)-3-bromopyridiniumchloride (838 mg, 2.75 mmol) is given into a three-neck round bottom flask and water (17.5 mL) is added. The pH is set to 1.5 with nitric acid. Beads (17.0 g, wet) are added. The initiator solution is prepared by adding nitric acid (239 UL, 3.85 mmol), water (7 mL) and ceric ammonium nitrate (515 mg, 939 µmol) to a dropping funnel. Both mixtures are degassed by vacuum and nitrogen. The suspension is heated to 30° C. and the initiator solution is added as fast as possible. The mixture is stirred for four hours, than filtrated and washed as described above. The resulting colorless solid is dried in vacuum.

Yield: 3.17 g

Functionalization of Beads with 1-(2-methacrylamidoethyl)-3-iodopyridiniumchloride

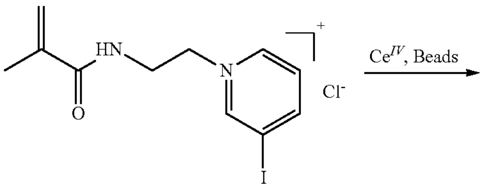

-continued

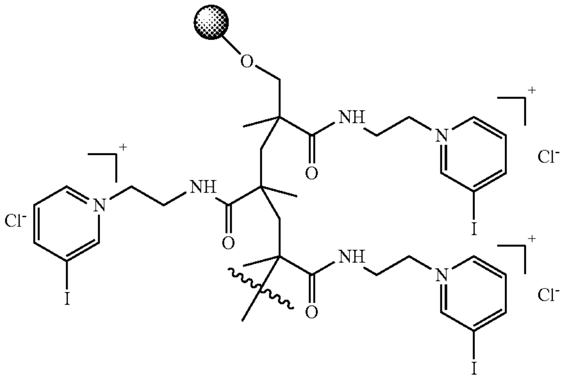

The 1-(2-methacrylamidoethyl)-3-iodopyridiniumchloride (970 mg, 2.75 mmol) is given into a three-neck round bottom flask and water (17.5 mL) is added. The pH is set to 1.5 with nitric acid. Beads (17.0 g, wet) are added. The initiator solution is prepared by adding nitric acid (239 μL, 3.85 mmol), water (7 mL) and ceric ammonium nitrate (515 mg, 939 μmol) to a dropping funnel. Both mixtures are degassed by vacuum and nitrogen. The suspension is heated to 30° C. and the initiator solution is added as fast as possible. The mixture is stirred for four hours, than filtrated and washed as described above. The resulting colorless solid is dried in vacuum.

Yield: 3.22 g

Synthesis of a styrene based stationary phase

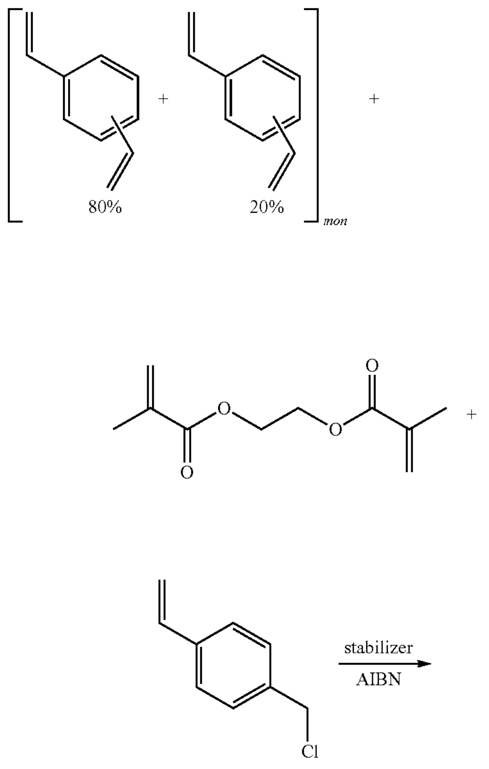

-continued

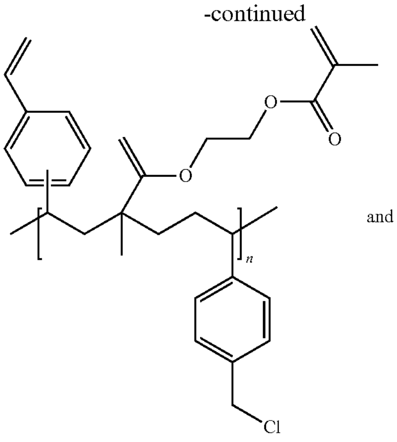

and more permutations

The reactor is filled with VE-water, Dodecane-1-sulfonic acid sodium salt (surfactant) and polyvinylalcohol 40-88 (stabilizer) and the organic phase is added, consisting of DVB/ethylstyrene (80/20, 83.2 g), EGDMA (41.6 g), 4-vinylbenzylchloride (13.9 g), toluene (90.3 g), 2-ethylene-1-hexanole (90.3 g) and AIBN (1.0 g).

The stirrer speed is set to 500 rpm in 10 sec. and the resulting emulsion is stirred for 30 min. at 25° C.

Water (640 g) is added and the speed of the stirrer is set to 120 rpm. After the emulsion is stable, a temperature ramp is started. 25° C.-72° C. in 90 min and 72° C. is held for 120 min. 72° C.-82° C. in 20 min and 82° C. is held for 120 min. The Temperature then is reduced to 60° C. in 30 min and held there for 12 hours.

The resulting polymer is washed with VE water and organic solvents.

The polymer is then dried at 50° C. for 24 hours in vacuum.

Analytics calculated Cl content: 2.33% CI

X-ray fluorescence analysis: 2.5% Cl

Elemental Analysis: 0.62% CI

Attachment of Functional Group

The styrole based polymer can be functionalized at the chlorine. For this, the chlorine is first exchanged to iodine by a Finkelstein reaction and then the functional group is introduced.

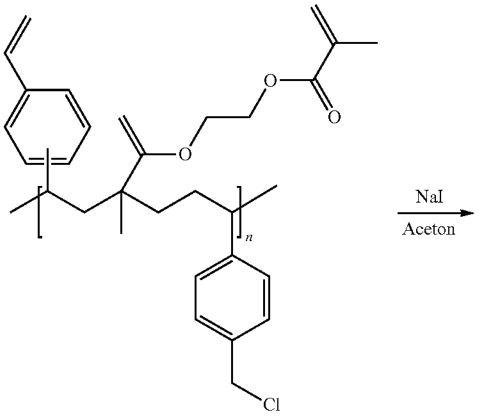

-continued

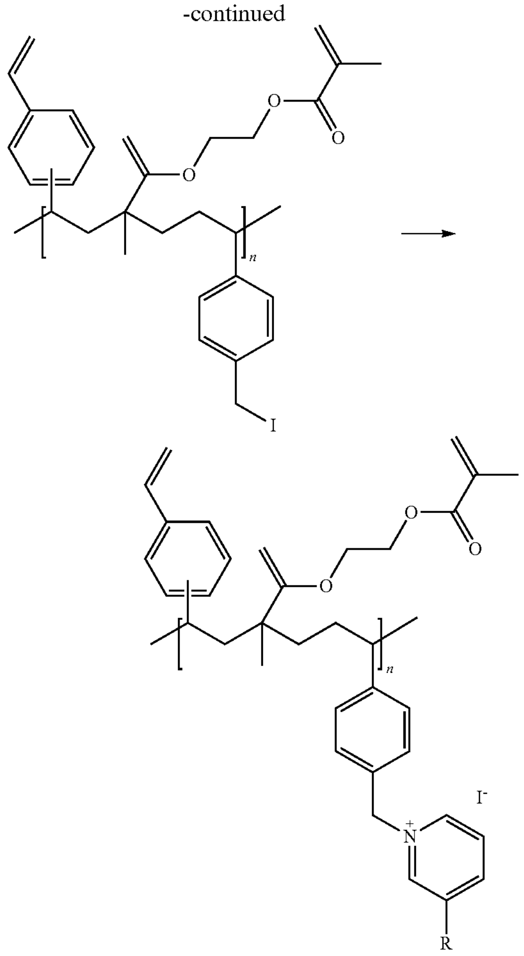

R=H, I

2. Application Examples

2.1 Use of Functionalized Beads (with Tentacles Prepared as Described Above) for Hydrophilic Separation of Insulin Chromatography columns are prepared with the functionalized beads. Columns are prepared with the beads carrying the functional groups which are functionalized with an iodine and with beads carrying functional groups that do not have an iodine. By this, one can make sure that the resulting separation is really due to halogen bonding if it can be only seen for the stationary phase that carries an iodine but not for the stationary phase that is otherwise identical but that is not functionalized by an iodine.

The sample comprising insulin and A21-desamidoinsulin is processed as follows:

Condition 1:

Eluent: (A) 50 mM $(NH_4)_2SO_4$ pH3,5

(B) 50 mM $(NH_4)_2SO_4$+1M NaCl pH3,5

Gradient: 0-15 min 100% (A)

30-50 min 50% (A) 50% (B)

Flow: 0.5 mL/min

Detektion: UV214 nm

Temp.: 25° C.

The result can be seen in FIG. 1.

The graphs show the chromatograms for the following stationary phases:

A Bead functionalized with iodine carrying functional groups

B Bead functionalized with iodine carrying functional groups (half amount of functional groups compared to A)

C Bead functionalized with functional groups without iodine

D Bead functionalized with functional groups without iodine (half amount of functional groups compared to C)

E Base bead—not functionalized

It can be seen that graphs A and B with the material carrying iodine groups shows a stronger retention compared to the materials which do not have iodine. But insulin and A21-desamidoinsulin are not separated.

Condition 2:

Eluent: (A) 100 mM $NH_4H_2PO_4$ PH7,3

(B) 100 mM $NH_4H_2PO_4$+1M NaCl PH7,3

Gradient: 0-15 min 100% (A)

30-50 min 50% (A) 50% (B)

Flow: 0.5 mL/min

Detektion: UV214 nm

Temp.: 25° C.

Figure 2:
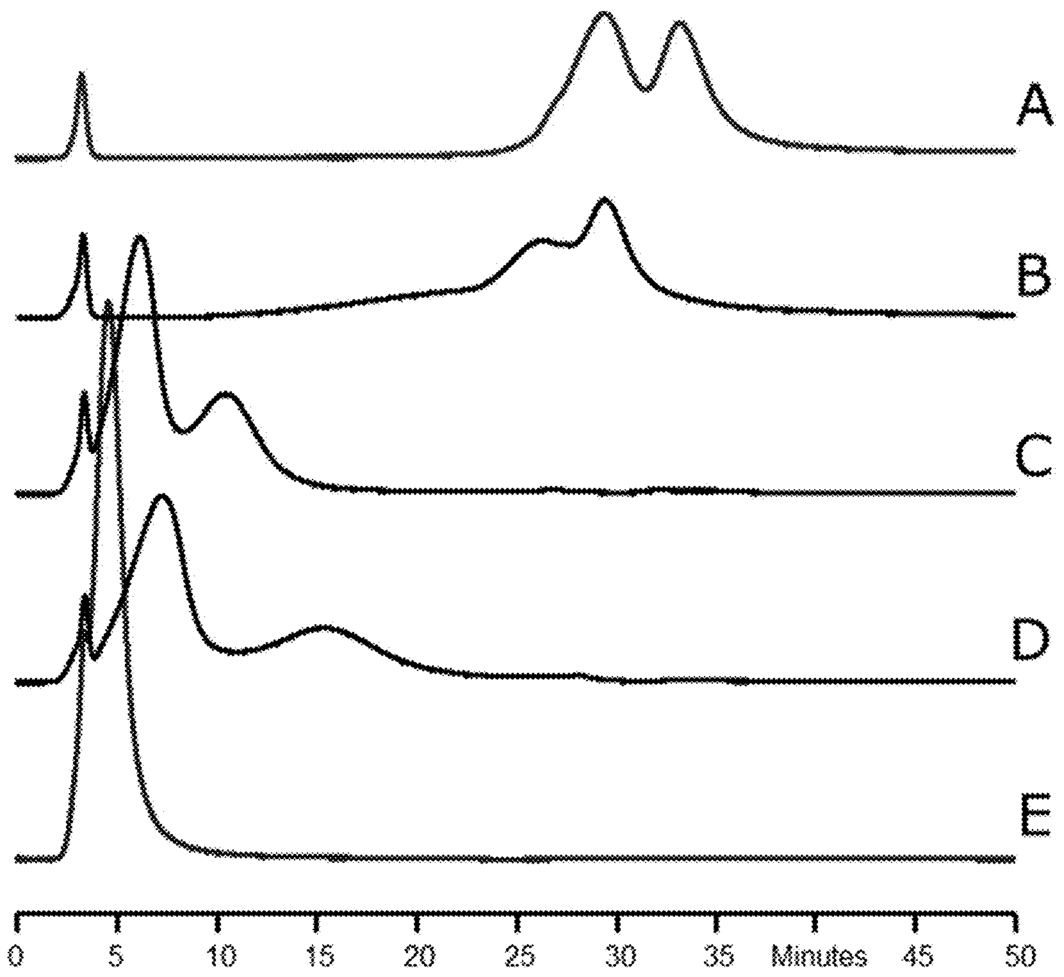

The result can be seen in FIG. 2.

The graphs show the chromatograms for the following stationary phases:

A Bead functionalized with iodine carrying functional groups

B Bead functionalized with iodine carrying functional groups (half amount of functional groups compared to A)

C Bead functionalized with functional groups without iodine

D Bead functionalized with functional groups without iodine (half amount of functional groups compared to C)

E Base bead—not functionalized

It can be seen that graphs A and B with the material carrying iodine groups shows a stronger retention compared to the materials which do not have iodine and they show a separation of insulin and A21-desamidoinsulin. Materials C, D and E do only show a very little retention and separation of insulin and A21-desamidoinsulin.

This shows that the retention and separation of insulin and A21-desamidoinsulin is really based on halogen bonding. The only difference between the materials used in A/B and C/D is the iodine residue.

2.2 Use of Functionalized Beads (with Tentacles Prepared as Described Above) for Hydrophilic Separation of Different Proteins Proteins with lower pl (isoelectric point) tend to bind stronger to an iodated stationary phase according to the present invention than proteins with higher pl. A stronger ionic strength is necessary to elute proteins with lower pl. Also, proteins with higher content of carboxylic acids tend to bind stronger to the stationary phase. This effect depends on the tertiary structure of the protein, so exposure of the carboxylic acids also has to be considered. Therefore proteins like Carboanhydrase and InIB321-GFP can easily be separated. The samples comprising one of the proteins, listed in the following table, are processed as follows:

Eluent: (A) 20 mM tris(hydroxymethyl)aminomethane pH8

(B) 20 mM tris(hydroxymethyl)aminomethane+1M NaCl pH8

Gradient: 0-16 mL 100% (A)

16-96 mL from 100% (A) to 50% (A) 50% (B)

96-120 mL 100% (B)

Flow: 4 mL/min

Detection: UV280/UV260

Temp.: 4° C.

| Name | MW/ kDa | pl | #Carboxy/ MW | Elution conductivity mS/cm |
|---|---|---|---|---|
| SD12 | 18 | 4.6 | 1.56 | 16.40 |
| SD12_EKGE461ATGT | 18 | 4.6 | 1.44 | 17.00 |
| SD12_meth | 18 | 4.6 | 1.56 | 16.00 |
| SD12_EE480AA | 18 | 4.7 | 1.44 | 15.70 |
| SD12_EKGE461AHGH | 18 | 4.8 | 1.44 | 17.10 |
| B38 | 55 | 5.3 | 1.09 | 15.70 |
| MBP | 43 | 5.5 | 1.19 | 6.06 |
| Pia-1 | 56 | 5.9 | 1.16 | 9.60 |
| lnlB321-GFP | 60 | 5.9 | 1.17 | 17.40 |
| Carboanhydrase | 29 | 6.6 | 0.97 | 1.60 |
| RNase A | 14 | 8.6 | 0.71 | 5.20 |
| Cytochrom C | 12 | 9.6 | 1.00 | 7.95 |

This table shows the name of the tested protein and their individual values. MW: molecular weight in kDa, pl: isoelectric point, #Carboxy/MW: number of carboxylic acids divided by the molecular weight and elution conductivity at elution peaks maxima.

The interaction between the functional group on the stationary phase and carboxylic acid was proven by a crystal structure obtained from 3-iodo-1-methylpyridinium acetate. While the sum of the Van der Waals radii is 345 pm, the distance between iodine and oxygen is only 286 pm. Therefore a binding interaction is present.

2.3 Use of Functionalized Beads (Prepared as Described Above) for the Hydrophobic Separation of Low Molecular Weight Compounds The stationary phase is filled into a glass column. The eluent is n-pentane. The column is washed with n-pentane, then the analyte is applied to the column. Detection is done at the column outlet with the aid of a silicagel TLC plate with a UV indicator and a UV lamp. Rr is calculated based on the weight of the used solvent until elution of the compound divided by the mass of the solvent per column volume.

The results can be seen in Table 1.

| | without halogen $R_f$-value | with Br $R_f$-value | with I $R_f$-value * |
|---|---|---|---|
| Toluene | 2.97 | 2.72 | 3.64 (34%) |
| Benzene | 2.88 | 2.93 | 3.79 (29%) |
| Anisole | 2.74 | 3.11 | 3.93 (26%) |
| $PPh_3$ | 3.23 | 2.87 | 4.05 (41%) |
| Benzaldehyde | 2.75 | 3.26 | 4.20 (29%) |
| Pyridine | 3.34 | 3.48 | 4.38 (25%) |
| Aniline | 5.49 | 5.17 | 7.72 (50%) |
| Benzyle alcohol | 5.98 | 5.30 | 8.06 (52%) |

The resin with R=H is taken as reference. Different substances with electron donor functions were run through with n-pentane as mobile phase. The Results show the retention factor, which does not differ much between the reference material and the Br-substituted material. But the retention factors of the I-substituted material shows a significant rise in comparison to the Br-substituted material (percentage in brackets). The restrain is, depending on the functional group of the substance, between 25% and 52% higher.

The invention claimed is:

1. A stationary phase comprising a base material and at least one type of functional group, the functional group is covalently bonded to the base material, wherein the functional group is a positively charged heterocyclic aromatic group carrying at least one Cl, Br, or I residue according to (a) Formula III

III

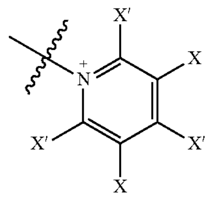

with X being independently of each other H, I, Br or Cl, and

X' being independently of each other H, an electron withdrawing group, or an electron donating group, whereby at least one X or X' is Cl, Br or I;

(b) Formula IV

IV

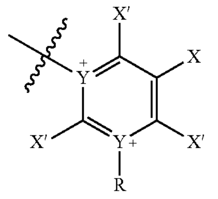

with R being H, an electron withdrawing group, or an electron donating group,

Y being independently of each other N or P,

X being independently of each other H, I, Br or Cl, and X' being independently of each other H, an electron withdrawing group, or or an electron donating group, whereby at least one X or X' is Cl, Br or I;

(c) one of the following structures, with X being independently of each other H, a $C_1$-$C_6$ alkyl group, I, Br or Cl,

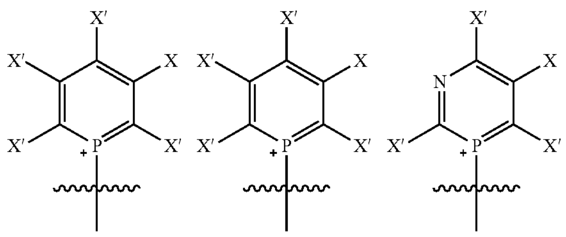

-continued

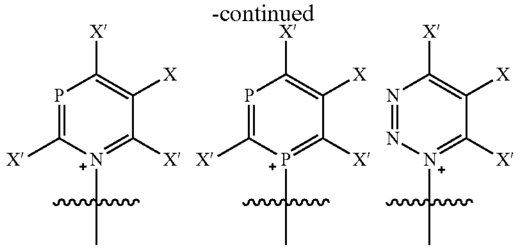

and X' and X" being independently of each other H, an electron withdrawing group, or an electron donating group, and R being H, an electron withdrawing group, or an electron donating group, and whereby at least one X or X' is Cl, Br or I; or (d) Formula VII

VII

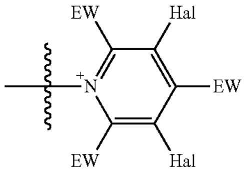

with EW being independently of each other H, an electron withdrawing group, or an electron donating group;

and Hal being independent of each other H, $CH_3$, Cl, Br or I, whereby at least one Hal is Cl, Br or I.

2. The stationary phase according to claim 1, wherein the base material is a bead or a membrane.

3. The stationary phase according to claim 1, wherein the functional groups are bonded to the base material via a linker.

4. The stationary phase according to claim 1, wherein the functional groups are end groups of polymer chains grafted onto the base material.

5. The stationary phase according to claim 1, wherein the base material is an organic polymer.

6. A chromatography column comprising a stationary phase according to claim 1.

7. A process for the separation of a target molecule from at least one other compound, said process comprising:

contacting a stationary phase according to claim 1 with a liquid comprising the target molecule and at least one other compound and wherein the target molecule shows an interaction with the stationary phase that is different from the interaction of the other compound with the stationary phase.

8. A process according to claim 7, wherein the process is a process for chromatographic separation of a target molecule from at least one other compound whereby the stationary phase is present in a chromatography column and the liquid comprising the target molecule and the at least one other compound is run through the column whereby the target molecule and the other compounds present in the liquid are eluted from the column depending on their interaction with the stationary phase.

9. A process according to claim 7, wherein the target molecule is a protein.

10. A process according to claim 7, wherein the process is performed by loading the stationary phase with an aqueous loading buffer of a certain pH and a certain ionic strength and eluting the target molecule with an aqueous elution buffer of the same pH but another ionic strength.

11. A stationary phase comprising a base material and at least one type of functional group, wherein the functional group is covalently bonded to the base material, wherein the functional group is a positively charged heterocyclic aromatic group carrying at least one Cl, Br, or I residue according to (a) Formula III

III

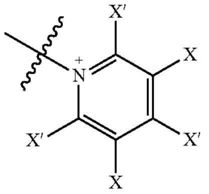

with X being independently of each other H, I, Br or Cl, and

X' being independently of each other H, an electron withdrawing group, or an electron donating group, whereby at least one X or X' is Cl, Br or I.

12. The stationary phase according to claim 11, wherein the base material is a bead or a membrane.

13. The stationary phase according to claim 11, wherein the functional groups are bonded to the base material via a linker.

14. The stationary phase according to claim 11, wherein the functional groups are end groups of polymer chains grafted onto the base material.

15. The stationary phase according claim 11, wherein the base material is an organic polymer.

16. The stationary phase of claim 1, wherein in Formula III, the electron withdrawing group is I, Br, Cl, F, or $NO_2$, and the electron donating group is $C_1$-$C_{10}$ alkyl, $C_2$-$C_6$ alkenyl, $C_2$-$C_6$ alkynyl, or $C_6$-$C_{12}$ aryl.

17. The stationary phase of claim 1, wherein in Formula IV, for R, the electron donating group is $C_1$-$C_{10}$ alkyl, aryl, $C_2$-$C_6$ alkenyl, or $C_2$-$C_6$ alkynyl; and for X' the electron withdrawing group is I, Br, Cl, F, or $NO_2$, and the electron donating group is $C_1$-$C_{10}$ alkyl, $C_2$-$C_6$ alkenyl, $C_2$-$C_6$ alkynyl, or $C_6$-$C_{12}$ aryl.

18. The stationary phase of claim 1, wherein in (c), for X' and X", the electron withdrawing group is I, Br, or Cl, and the electron donating group is a $C_1$-$C_6$ alkyl group; and for R the electron donating group is $C_1$-$C_6$ alkyl, $C_6$ aryl, $C_2$-$C_6$ alkenyl, or $C_2$-$C_6$ alkynyl.

19. The stationary phase of claim 1, wherein in Formula VII, the electron donating group is $CH_3$.

20. The stationary phase of claim 11, wherein in Formula III, the electron withdrawing group is I, Br, Cl, F, or $NO_2$, and the electron donating group is $C_1$-$C_{10}$ alkyl, $C_2$-$C_6$ alkenyl, $C_2$-$C_6$ alkynyl, or $C_6$-$C_{12}$ aryl.

* * * * *